United States Patent
Kettler

(10) Patent No.: US 6,601,862 B2
(45) Date of Patent: Aug. 5, 2003

(54) TRICYCLE AND INTERMEDIATE FRAME FOR TRICYCLE

(75) Inventor: Heinz Kettler, Ense-Parsit (DE)

(73) Assignee: Heinz Kettler GmbH & Co., Ense-Parsit (DE)

(*) Notice: Subject to any disclaimer, the term of this patent is extended or adjusted under 35 U.S.C. 154(b) by 0 days.

(21) Appl. No.: 09/812,591

(22) Filed: Mar. 21, 2001

(65) Prior Publication Data

US 2001/0035626 A1 Nov. 1, 2001

(30) Foreign Application Priority Data

Apr. 27, 2000 (DE) .......................... 200 07 608

(51) Int. Cl.[7] .............................. B62K 3/14
(52) U.S. Cl. ....................... 280/231; 280/282
(58) Field of Search ................... 280/62, 231, 281

(56) References Cited

U.S. PATENT DOCUMENTS

| | | | | |
|---|---|---|---|---|
| 1,143,127 A | | 6/1915 | Mentzer et al. ............ 411/331 |
| 3,608,917 A | * | 9/1971 | Cogliano ................... 280/231 |
| 3,717,360 A | * | 2/1973 | Kennedy ................... 280/231 |
| 3,866,945 A | * | 2/1975 | Bingham ................... 280/202 |
| 3,954,283 A | * | 5/1976 | Boehm et al. ............. 280/273 |
| 4,458,908 A | * | 7/1984 | Strong ....................... 280/231 |
| 4,592,570 A | * | 6/1986 | Nassiri ...................... 280/650 |
| 4,600,206 A | * | 7/1986 | Di Paolo ................... 280/231 |
| 5,067,738 A | * | 11/1991 | O'Connor .................. 280/204 |
| 5,076,623 A | * | 12/1991 | Richards ................... 292/144 |
| 5,282,639 A | * | 2/1994 | Chen ......................... 280/231 |
| 5,727,801 A | * | 3/1998 | Barney et al. ............. 280/231 |
| 5,743,543 A | * | 4/1998 | Chiu .......................... 280/231 |
| 5,836,600 A | * | 11/1998 | Chiu .......................... 280/231 |
| 5,842,710 A | * | 12/1998 | Couture ..................... 280/204 |
| 6,095,539 A | * | 8/2000 | Graham ..................... 280/231 |
| 6,312,001 B1 | * | 11/2001 | Boyer ........................ 280/282 |

FOREIGN PATENT DOCUMENTS

| | | |
|---|---|---|
| DE | 3720112 | 12/1988 |
| DE | 4242119 | 6/1994 |
| DE | 19507921 | 9/1996 |
| DE | 200007084 | 3/2000 |
| FR | 863253 | 3/1941 |
| FR | 2703972 | 10/1994 |

* cited by examiner

Primary Examiner—Lesley D. Morris
Assistant Examiner—L. Lum
(74) Attorney, Agent, or Firm—Greenblum & Bernstein, P.L.C.

(57) ABSTRACT

Tricycle and intermediate frame for tricycle. The tricycle includes a rear axle, rear wheels coupled to free ends of the rear axle, a rear seat, and a rear frame coupled to the rear axle and to the rear seat. A front frame includes a fork tube, and the front frame and the rear frame are detachably connectable to each other. The tricycle also includes a handlebar, and a fork coupled to the handle bar. The fork is rotatably coupled to the fork tube. A front wheel includes pedal cranks and is rotatably coupled to the fork. A second seat and a holding element are also included. The intermediate frame is arranged to support the second seat and the holding element, and is detachably coupled between the front frame and the rear frame.

29 Claims, 5 Drawing Sheets

TRICYCLE AND INTERMEDIATE FRAME FOR TRICYCLE

CROSS-REFERENCE TO RELATED APPLICATIONS

The present application claims priority under 35 U.S.C. § 119 of German Patent Application No. 200 07 608.6, filed on Apr. 27, 2000, the disclosure of which is expressly incorporated by reference herein in its entirety.

BACKGROUND OF THE INVENTION

1. Field of the Invention

The present invention relates to a tricycle, e.g., a children's tricycle, that includes a rear frame and a front frame, which are detachably connectable together. The rear frame is secured to a rear axle with rear wheels and to a seat. The front frame includes a fork tube, which secures a fork that carries a handlebar, and rotatably supports a front wheel equipped with pedal cranks.

2. Discussion of Background Information

A children's tricycle of the above-described type is known, e.g., from German Utility Model 200 00 708.4.

The above-noted children's tricycle has two essential advantages. Due to its two-part design of the frame, it is possible to transport the children's tricycle in a space-saving manner, both with respect to delivery and sale and with respect to transportation in a car. Further, the frame length, i.e., the distance between the front frame and the rear frame is adjustable, so that the tricycle can be adapted to a child's height.

SUMMARY OF THE INVENTION

The present invention provides a tricycle, e.g., a children's tricycle, similar in general to that discussed above, which, while being of a simple construction and producible in a simple manner at low costs, can also be used for several children.

Thus, the invention includes an intermediate frame arranged in a detachably connectable manner between the front frame and the rear frame. The intermediate frame is also arranged to support a second seat and a holding element for the hands.

The tricycle according to the invention includes a number of considerable advantages. Due to the modular design of the frame, it is possible to insert the intermediate frame between the front frame and the rear frame of a standard tricycle, thereby converting a standard tricycle into a tandem tricycle. In this manner, two riders can ride the tricycle at the same time, which can quite considerably enhance the functional value of and the fun with the tricycle.

A self-supporting rigid construction that meets the highest safety standards is obtained owing to the connection of the rear frame, the intermediate frame and the front frame.

The holding element is preferably designed in the form of a handlebar so that the rider on the rear seat is held and supported in the customary way.

To safely receive the feet of the child rider at the rear, it can be advantageous for the intermediate frame to support at least one foot rest. Preferably, one foot rest is provided at the right side and one at the left side of the frame.

Preferably, the connection of the front frame to the intermediate frame and the connection of the intermediate frame to the rear frame is respectively established by a telescopic plug-in connection. Each plug-in connection can preferably be provided with an outer telescopic tube equipped with a fixing element and with an inner telescopic tube having a plurality of locking positions. The fixing element, which may be designed, e.g., as a child-proof fixing screw, ensures the stability of the whole frame. Moreover, it may be possible, due to the plurality of locking positions, to adjust the frame length to the respective heights of the riders.

Preferably, the telescopic plug-in connections are of a same construction to permit removal of the intermediate frame and to enable assembly of the tricycle in the standard manner, i.e., so that only one rider will ride.

The invention also relates to an intermediate frame for a tricycle of the above-described type. It is possible with the intermediate frame of the instant invention to convert any prior-art tricycle with a separate rear frame/front frame configuration into a tandem tricycle.

According to the invention, it can also be possible by using the intermediate frame to assemble, not only a tandem tricycle, but also a tricycle for three or more riders. Thus, an additional frame must be inserted or added for each additional rider. Consequently, virtually any desired number of riders may ride the tricycle. It is noted, however, that both the strength of the entire frame construction and the design of the brakes must be adapted accordingly.

The present invention is directed to a tricycle that includes a rear axle, rear wheels coupled to free ends of the rear axle, a rear seat, and a rear frame coupled to the rear axle and to the rear seat. A front frame includes a fork tube, and the front frame and the rear frame are detachably connectable to each other. The tricycle also includes a handlebar, and a fork coupled to the handle bar. The fork is rotatably coupled to the fork tube. A front wheel includes pedal cranks and is rotatably coupled to the fork. A second seat and a holding element are also included. An intermediate frame is arranged to support the second seat and the holding element, and is detachably coupled between the front frame and the rear frame.

In accordance with a feature of the present invention, the holding element can include a handlebar.

According to another feature of the instant invention, at least one foot rest can be supported on the intermediate frame.

Telescopic plug-in connections can be provided between the front frame and the intermediate frame and between the intermediate frame and the rear frame. In this way, establishing detachable connections. The telescopic plug-in connections may include an outer telescopic tube with a fixing element and an inner telescopic tube with a plurality of locking positions. The fixing element can include a childproof fixing screw. Moreover, the telescopic plug-in connections may be designed in a substantially similar manner.

In accordance with still another feature of the present invention, a second intermediate frame can be detachably connectable between one of the rear frame and the intermediate frame and the intermediate frame and the front frame. The second intermediate frame may include a third seat and a second holding element.

The instant invention is directed to an intermediate frame for a tricycle having a two piece detachably connectable frame. The intermediate frame includes a seat support and a holding element. The intermediate frame is detachably connectable between the two pieces of the two piece frame.

In accordance with a feature of the invention, the intermediate frame may include an elongated element, and can further include coupling devices arranged at opposite ends of the elongated element. A first coupling device located at a first end of the elongated element may be detachably and telescopically connectable to a first piece of the two piece frame, and a second coupling device located at a second end of the elongated element may be detachably and telescopically connectable to a second piece of the two piece frame. Each of the coupling devices can include an outer telescopic tube with a fixing element and an inner telescopic tube with a plurality of locking positions. The fixing element may include a child-proof fixing screw, and the plurality of locking positions may include a plurality of recesses sized to receive at least a portion of the child-proof fixing screw. The first coupling device can be substantially similar to a coupling device arranged on the second piece, the second coupling device can be substantially similar to a coupling device arranged on the first piece.

Further, the coupling devices arranged at opposite ends of the elongated element can be complementary coupling devices.

Moreover, the holding element can be coupled to the elongated element.

At least one foot rest can be provided, and it can be preferable that the at least one footrest include at least two footrests arranged opposite each other.

In accordance with a further feature of the invention, the holding element may be coupled to the seat support.

According to a still further feature of the instant invention, a seat can be coupled to the seat support. Further, the holding element can be coupled to the seat.

The present invention is directed to an apparatus that includes a rear frame coupled to a rear seat and at least one wheel, and a front frame coupled to at least one wheel. The front frame and the rear frame are detachably connectable to each other. An intermediate frame is arranged to support a second seat, and the intermediate frame is detachably coupled between the front frame and the rear frame.

In accordance with yet another feature of the invention, the intermediate frame can include a seat support and a holding element. The intermediate frame can include an elongated element, and may further include coupling devices arranged at opposite ends of the elongated element. A first coupling device located at a first end of the elongated element can be detachably and telescopically connectable to the rear frame, and a second coupling device located at a second end of the elongated element can be detachably and telescopically connectable to the front frame. Each of the coupling devices may include an outer telescopic tube with a fixing element and an inner telescopic tube with a plurality of locking positions. The fixing element can include a child-proof fixing screw, and the plurality of locking positions can include a plurality of recesses sized to receive at least a portion of the child-proof fixing screw. Moreover, the first coupling device may be substantially similar to a coupling device arranged on the front frame, and the second coupling device may be substantially similar to a coupling device arranged on the rear frame. Still further, the coupling devices arranged at opposite ends of the elongated element may be complementary coupling devices.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
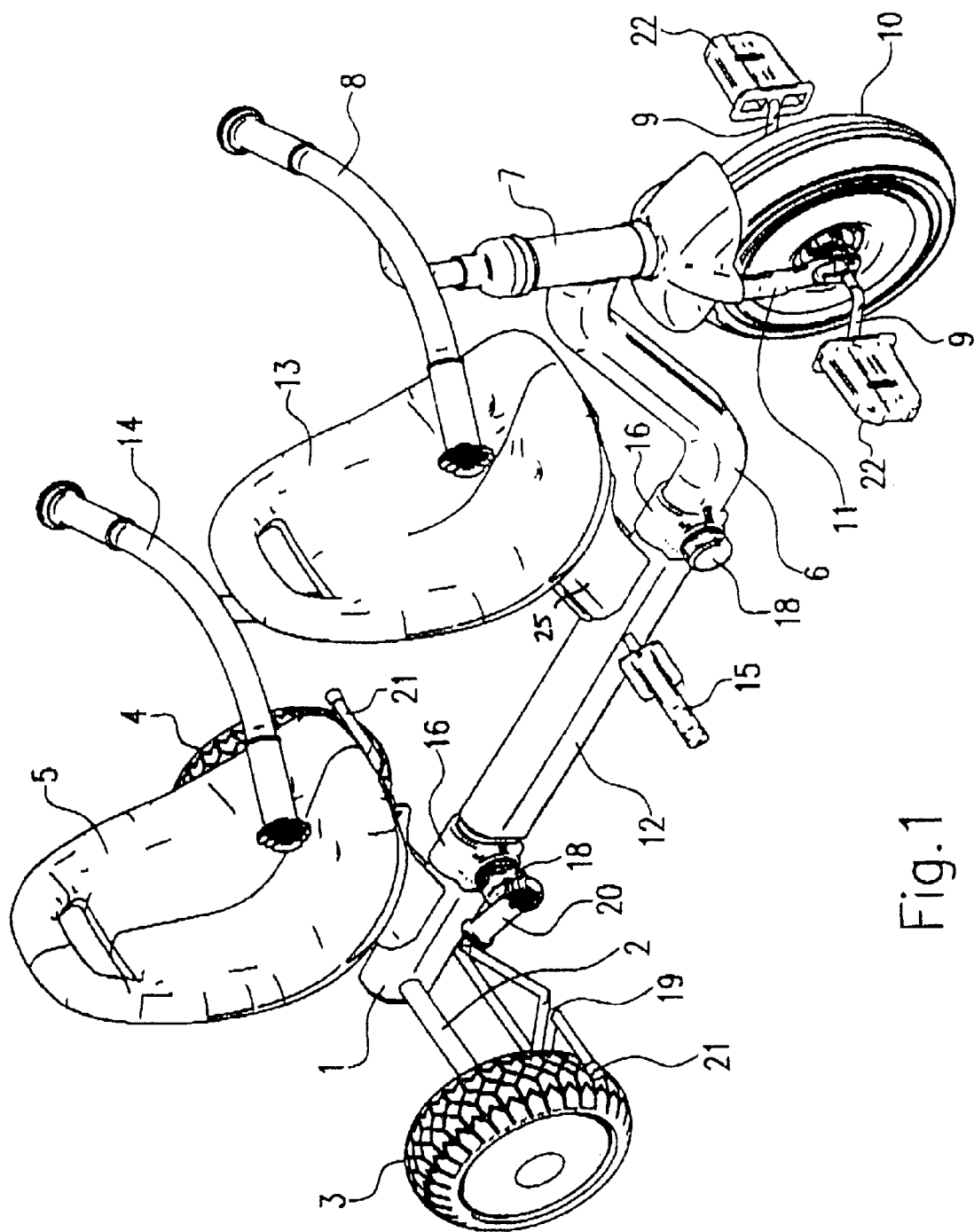
FIG. 1 illustrates a simplified perspective view of a tricycle according to the features of the present invention.

FIG. 1 shows a tricycle, e.g., a children's tricycle, which includes a rear frame 1 and a front frame 6. A rear axle 2 is secured to rear frame 1, and the free ends rear axle 2 rotatably support rear wheels 3 and 4. Rear frame 1 also carries a first seat 5. A front portion of rear frame 1 is secured to an outer telescopic tube 16 which includes a fixing element 18, e.g., in the form of a child-proof, manually operable screw.

Further, FIG. 1 shows a brake grip 20 which is secured to a pivotable brake linkage 19 to press a brake lever 21 against rear wheels 3 and 4.

Figure 2:
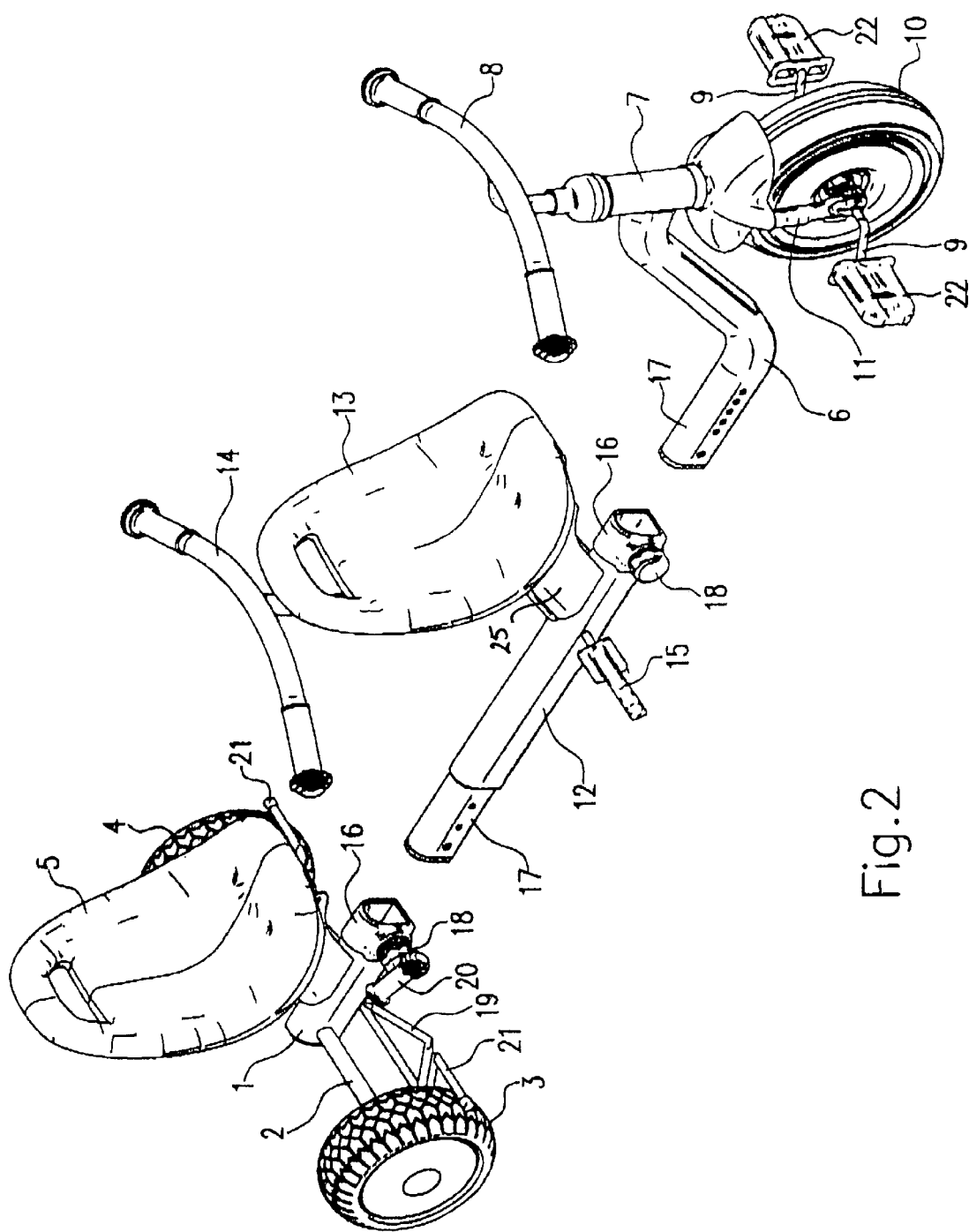
FIG. 2 illustrates an exploded view of the perspective view depicted in FIG. 1.

An intermediate frame 12 is shown which includes a front end portion having an outer telescopic tube 16 with a fixing element 18 and a rear end portion having an inner telescopic tube 17, which is more clearly depicted in FIG. 2. The inner telescopic tube 17 is slidable into outer telescopic tube 16 on the front portion of rear frame 1. Moreover, inner telescopic tube 17 includes a plurality of locking positions (e.g., recesses) which can be brought into engagement with a screw (not shown in detail) of fixing element 18. Due to the plurality of locking positions, a longitudinal adjustment is possible between the individual frames. As for fixing element 18, Applicants refer to German utility model 200 00 708.4, the disclosure of which is express incorporated by reference herein in its entirety.

Figure 3:
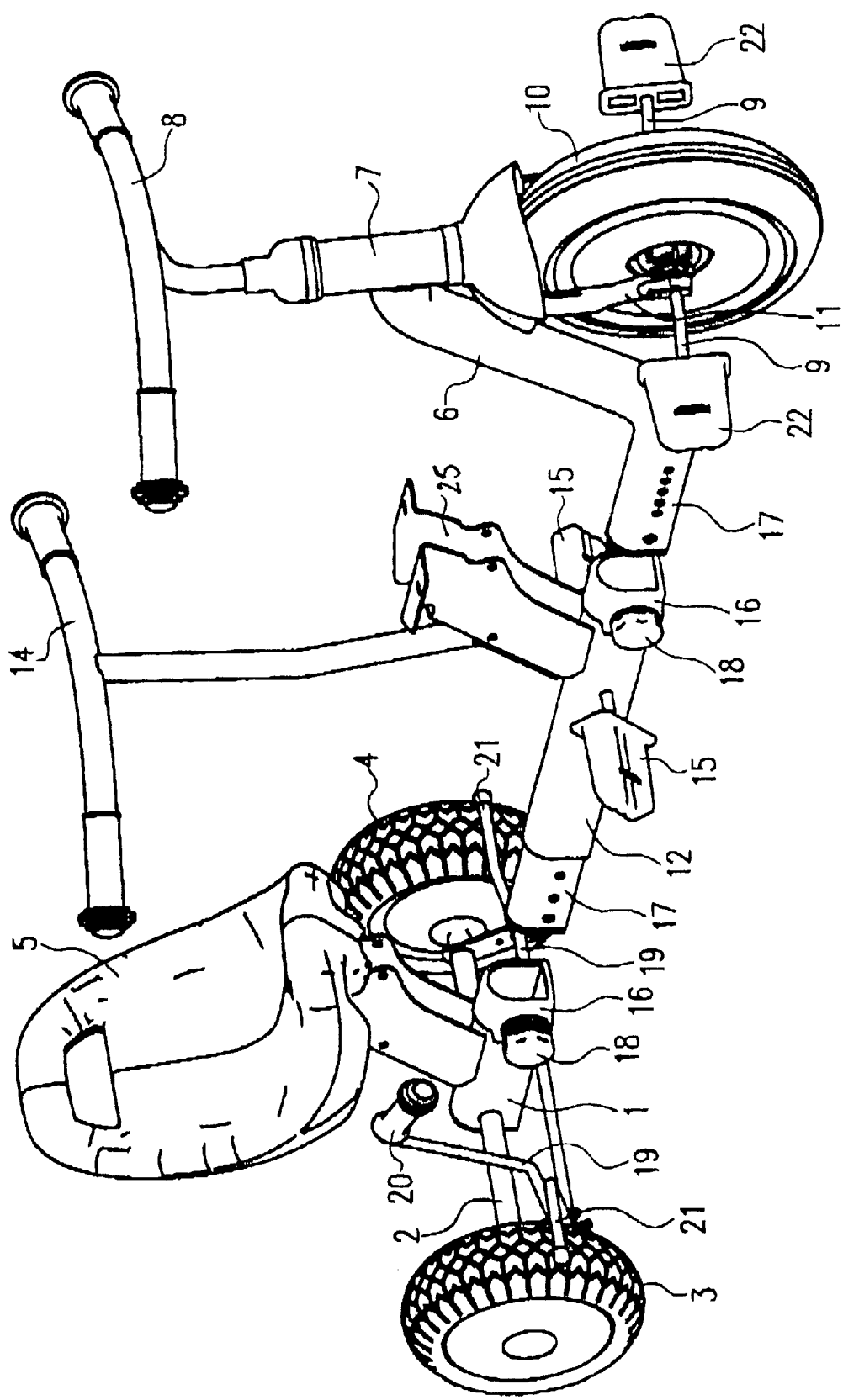
FIG. 3 illustrates a perspective view illustrating the intermediate member without the seat attached thereto.

Intermediate frame 12 carries or is coupled to lateral foot rest 15, e.g., two lateral foot rests, and a second seat 13. As depicted in FIG. 3, second seat 13 can be supported on a carrier 25. Further, a handlebar-like holding element 14 can be secured to intermediate frame 12. Alternatively, holding element 14 can be secured to carrier 25 or even to seat 13.

Front frame 6 includes a fork tube 7, and a fork 11, which is connected to a handlebar 8, can be rotatably supported in fork tube 7. A front wheel 10, which is equipped with cranks 9 and pedals 22, is coupled to fork 11. Front wheel 10 can be, e.g., a freewheel, which is known in the art.

Figure 4:
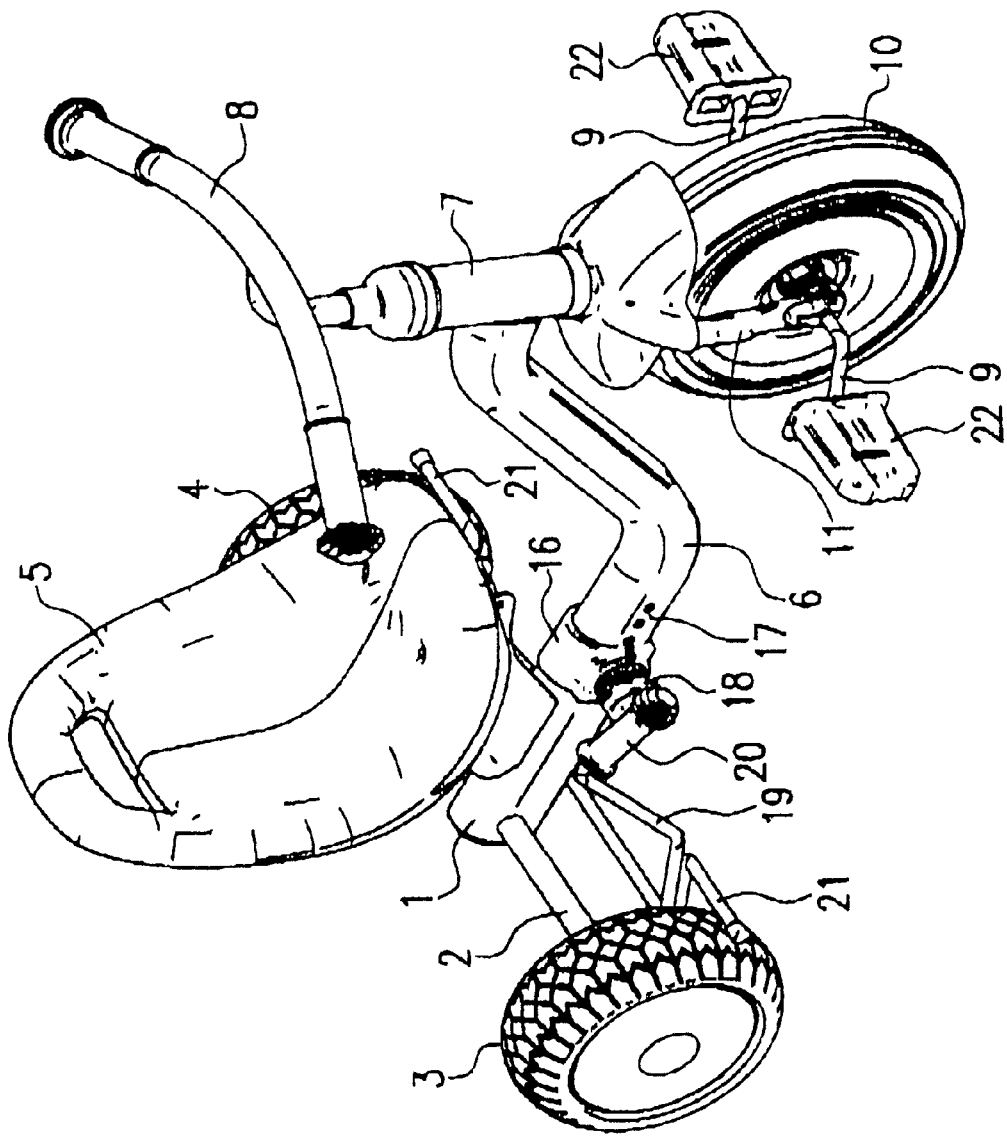
FIG. 4 illustrates the tricycle according to the invention without an intermediate frame.
Figure 5:
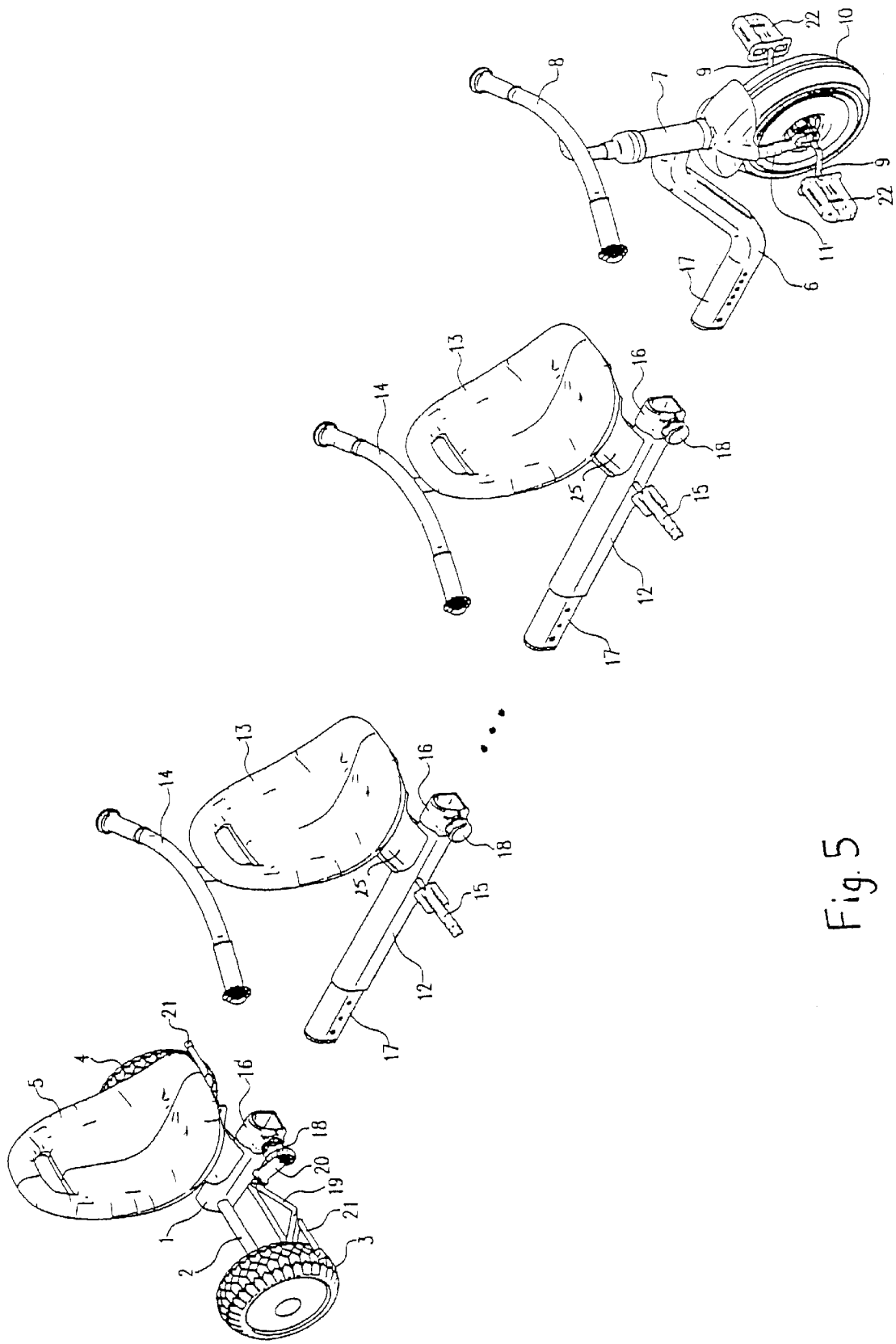
FIG. 5 illustrates an exploded view of an alternative embodiment of the instant invention in which two or more intermediate frames are utilized to accommodate three or more riders.

As depicted in the Figures, it is apparent that intermediate frame 12 can be inserted between front frame 6 and rear frame 1, thus, forming a tandem-type tricycle, as illustrated in FIG. 1. Upon removing intermediate frame 12, a standard tricycle, as depicted in FIG. 4, can be obtained. Moreover, in accordance with the features of the invention, it is also possible to assemble, not only a tandem tricycle, but also a tricycle for three or more riders, as illustrated in FIG. 5. As shown, an additional frame must be inserted or added for each additional rider. Consequently, virtually any desired number of riders may ride the tricycle. However, it is noted that both the strength of the entire frame construction and the design of the brakes must be adapted accordingly.

While the exemplary embodiments have depicted children's tricycles, it is note that, in accordance with the features of the instant invention, those ordinarily skilled in the art will find the separably connectable front, rear, and intermediate frames can also be utilized in other similar vehicles such as adult tricycles, bicycles, four-wheel pedal vehicles, etc., without departing from the scope of the present invention.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A tricycle comprising:
   a rear axle;
   rear wheels coupled to free ends of said rear axle;
   a rear seat;
   a rear frame, wherein said rear axle and said rear seat are supported by said rear frame;
   a front frame comprising a fork tube, wherein said front frame and said rear frame are detachably connectable to each other;
   a handlebar;
   a fork coupled to said handle bar, and said fork being rotatably coupled to said fork tube;
   a front wheel including pedal cranks being rotatably coupled to said fork;
   a second seat;
   a holding element; and
   an intermediate frame being structured and arranged to support said second seat and said holding element, and being detachably couplable between said front frame and said rear frame.

2. The tricycle in accordance with claim 1, wherein said holding element comprises a handlebar.

3. The tricycle in accordance with claim 1, wherein at least one foot rest is supported on said intermediate frame.

4. The tricycle in accordance with claim 1, wherein telescopic plug-in connections are provided between said front frame and said intermediate frame and between said intermediate frame and said rear frame, thereby establishing detachable connections.

5. The tricycle in accordance with claim 4, wherein said telescopic plug-in connections are designed in a substantially similar manner.

6. The tricycle in accordance with claim 4, wherein said telescopic plug-in connections comprise an outer telescopic tube with a fixing element and an inner telescopic tube with a plurality of locking positions.

7. The tricycle in accordance with claim 6, wherein said fixing element comprises a child-proof fixing screw.

8. The tricycle in accordance with claim 1, further comprising a second intermediate frame detachably connectable between one of the rear frame and the intermediate frame and the intermediate frame and the front frame.

9. The tricycle in accordance with claim 8, wherein said second intermediate frame comprises a third seat and a second holding element.

10. An intermediate frame for a tricycle having a two piece detachably connectable frame, said intermediate frame comprising:
    a seat support; and
    a holding element,
    wherein said intermediate frame is detachably connectable between the two pieces of the two piece frame.

11. The intermediate frame in accordance with claim 10, wherein said intermediate frame comprises an elongated element, and further comprises coupling devices arranged at opposite ends of said elongated element.

12. The intermediate frame in accordance with claim 11, wherein a first coupling device located at a first end of said elongated element is detachably and telescopically connectable to a first piece of the two piece frame, and
    wherein a second coupling device located at a second end of said elongated element is detachably and telescopically connectable to a second piece of the two piece frame.

13. The intermediate frame in accordance with claim 12, wherein each of said coupling devices comprises an outer telescopic tube with a fixing element and an inner telescopic tube with a plurality of locking positions.

14. The intermediate frame in accordance with claim 13, wherein said fixing element comprises a child-proof fixing screw, and said plurality of locking positions comprises a plurality of recesses sized to receive at least a portion of said child-proof fixing screw.

15. The intermediate frame in accordance with claim 12, wherein said first coupling device is substantially similar to a coupling device arranged on the second piece, and
    wherein said second coupling device is substantially similar to a coupling device arranged on the first piece.

16. The intermediate frame in accordance with claim 11, wherein said coupling devices arranged at opposite ends of said elongated element are complementary coupling devices.

17. The intermediate frame in accordance with claim 11, wherein said holding element is coupled to said elongated element.

18. The intermediate frame in accordance with claim 10, further comprising at least one foot rest.

19. The intermediate frame in accordance with claim 18, wherein said at least one footrest comprises at least two footrests arranged opposite each other.

20. The intermediate frame in accordance with claim 10, wherein said holding element is coupled to said seat support.

21. The intermediate frame in accordance with claim 10, further comprising a seat coupled to said seat support,
wherein said holding element is coupled to said seat.

22. An apparatus comprising:
a rear frame coupled to a rear seat and at least one wheel;
a front frame coupled to at least one wheel, wherein said front frame and said rear frame are structured and arranged to be alternatively directly and indirectly detachably connectable to each other; and
an intermediate frame arranged to support a second seat, wherein said intermediate frame is structured and arranged to be detachably coupled to said front frame and to said rear frame when said front frame and said rear frame are indirectly detachably connected to each other.

23. The apparatus in accordance with claim 22, said intermediate frame comprising a seat support and a holding element.

24. The apparatus in accordance with claim 23, wherein said intermediate frame comprises an elongated element, and further comprises coupling devices arranged at opposite ends of said elongated element.

25. The apparatus in accordance with claim 24, wherein a first coupling device located at a first end of said elongated element is detachably and telescopically connectable to said rear frame, and
wherein a second coupling device located at a second end of said elongated element is detachably and telescopically connectable to said front frame.

26. The apparatus in accordance with claim 25, wherein each of said coupling devices comprises an outer telescopic tube with a fixing element and an inner telescopic tube with a plurality of locking positions.

27. The apparatus in accordance with claim 26, wherein said fixing element comprises a child-proof fixing screw, and said plurality of locking positions comprises a plurality of recesses sized to receive at least a portion of said child-proof fixing screw.

28. The apparatus in accordance with claim 25, wherein said first coupling device is substantially similar to a coupling device arranged on said front frame, and
wherein said second coupling device is substantially similar to a coupling device arranged on said rear frame.

29. The apparatus in accordance with claim 24, wherein said coupling devices arranged at opposite ends of said elongated element are complementary coupling devices.

* * * * *

UNITED STATES PATENT AND TRADEMARK OFFICE
CERTIFICATE OF CORRECTION

PATENT NO.     : 6,601,862 B2
DATED          : August 5, 2003
INVENTOR(S)    : H. Kettler et al.

It is certified that error appears in the above-identified patent and that said Letters Patent is hereby corrected as shown below:

<u>Title page,</u>
Item [75], Inventors, -- Joachim Kettler and Reinhard Rocholl -- should be added to the list of inventors.

Signed and Sealed this

Twentieth Day of January, 2004

JON W. DUDAS
*Acting Director of the United States Patent and Trademark Office*